Feb. 21, 1939.　　　　G. VAN YAHRES　　　　2,147,866
TREE CAVITY FILLING AND FILLER BLOCK THEREFOR
Filed Oct. 19, 1937
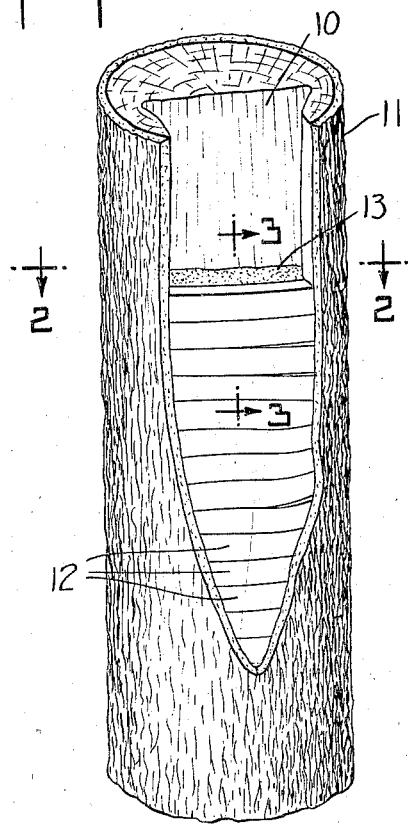
Fig.1.
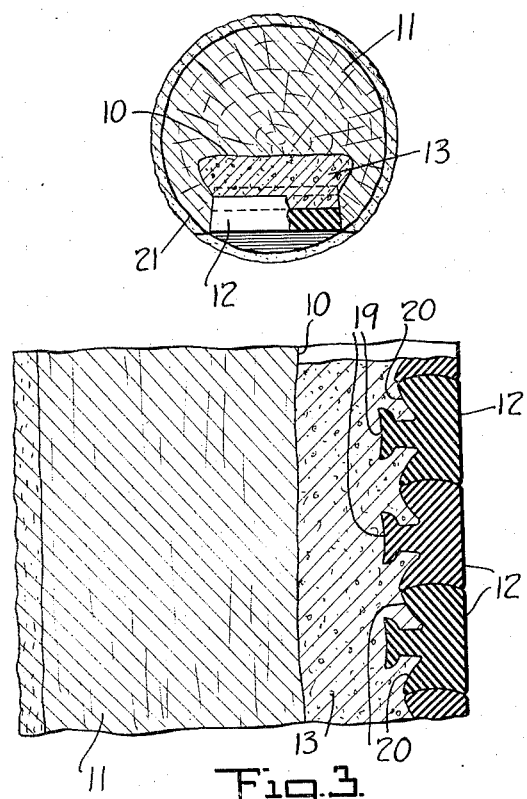
Fig.2.
Fig.3.
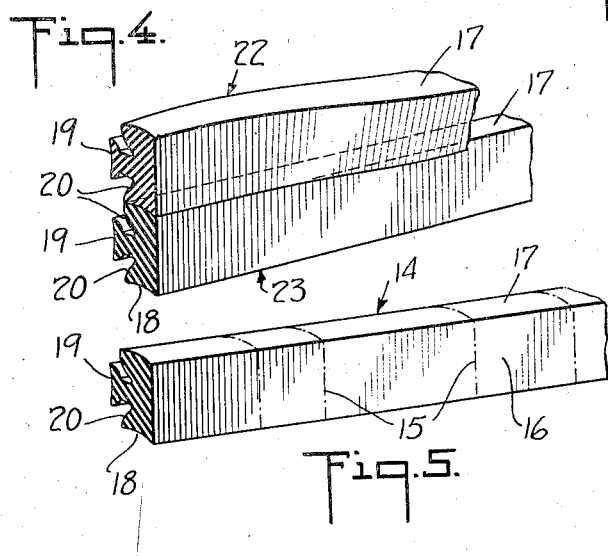
Fig.4.
Fig.5.
INVENTOR
George Van Yahres
BY
Frederick Breitenfeld
ATTORNEY Patented Feb. 21, 1939

2,147,866

UNITED STATES PATENT OFFICE 2,147,866

TREE CAVITY FILLING AND FILLER BLOCK THEREFOR

George Van Yahres, Westbury, N. Y.

Application October 19, 1937, Serial No. 169,807

8 Claims. (Cl. 47—8)

My present invention relates generally to tree surgery, and has particular reference to an improved tree cavity filling.

In my pending application for patent, Serial Number 124,428, I have described and illustrated a tree cavity filling characterized by the employment of certain novel filler blocks composed of vulcanized soft rubber. Briefly, the blocks are of a character which permit them to be cut to desired lengths from a continuous rod, the blocks thereupon being arranged in stacked relationship within the outer portion of the tree cavity so as to seal the latter, the filling being completed by the use of a poured binding medium which fills the inner portion of the tree cavity. Each of the blocks comprises at least one integral rearward undercut projection which becomes embedded in the binding medium, whereby the stack of filling blocks is firmly anchored in position.

The advantages of this general type of tree cavity filling, and of the special filler blocks, are fully set forth in said pending application for patent.

My present invention relates to certain specific improvemnts in a tree cavity filling of this general type; more particularly, to improvements in the structural nature of the rubber filler blocks, themselves.

The present improvements are intended to facilitate the procedure of quickly and expeditiously conforming a filling of the present character to the irregularities of the tree cavity. With this object in view, it is a characterizing feature of the present improvement to construct each filler block with top and bottom faces, of which one is convex and the other concave. As a result, each block as it is brought into stacked relation to the adjacent block may be arcuately adjusted, either partially or in its entirety, to conform the outer face of the resultant filling to the particular curvature or other irregularity of the tree which is being treated. This selective positioning of each block with respect to the adjacent block or blocks may be accomplished without impairing the security of the joints.

Coordinately, each block is provided with a depression in its rear face, and with an integral rib extending rearwardly from the base of the depression, the rib having a rearwardly enlarging width. As a result, the blocks are firmly locked in stacked relation in whatever adjusted or twisted relationship they may be stacked.

I achieve the foregoing objects, and such other objects as may hereinafter appear or be pointed out, in the manner illustratively exemplified in the accompanying drawing, wherein—

Figure 1 is a perspective view of a portion of a tree showing a cavity partially filled with a cavity filling of the present improved character;

Figure 2 is a cross-sectional view taken substantially along the line 2—2 of Figure 1;

Figure 3 is a cross-sectional view taken substantially along the line 3—3 of Figure 1;

Figure 4 is a fragmentary perspective view of two filler blocks of the present character arranged in a typical arcuately adjusted or twisted relationship; and Figure 5 is a perspective view of a portion of a rod or length of vulcanized soft rubber from which the filler blocks of the present invention may be formed.

In carrying out my present invention, the cavity 10 of a tree 11 is first treated in the regular way to clean it out thoroughly and to impart to it the proper shape. A series of filler blocks 12 composed of vulcanized soft rubber are then inserted into the outer portion of the cavity in superposed stacked relationship. Each of these blocks is preliminarily cut and whittled to a shape and size suitable for the particular cavity portion which it is to occupy. In performing this step, each block is purposely oversized by a slight amount so that it may be wedged into position in compressed condition, thereby causing it to brace itself firmly by virtue of its natural elasticity. As the insertion of the filler blocks proceeds, a mass of binding medium 13 is poured or otherwise introduced into the rear portion of the cavity. If desired, each block may be temporarily or permanently held in more firm association with the adjacent block by means of nails or spikes (not shown).

It will be understood that the blocks are not necessarily inserted in sequence from the lowest to the uppermost, and that in many cases it may be desirable to superpose some of the blocks from the bottom of the cavity toward the middle, and some other blocks from the top portion of the cavity downwards, so that the cavity filling is firmly completed by wedging into position an intermediate block.

The particular features of my present improvement are believed to be most clearly illustrated in Figures 3, 4, and 5.

In Figure 5, I have illustrated a rod or length 14 of vulcanized soft rubber from which the filler blocks may be successively cut to the desired lengths by severing the rod 14 transversely along lines such as those indicated by the reference numeral 15. It will be observed that the cross-section of the rod 14 is of a character which defines a front face 16 of substantially plane character, and top and bottom faces 17 and 18 one of which is convex and the other of which is concave. In the illustrated embodiment, the top face 17 is convex while the bottom face 18 is concave.

The rear face of the rod 14 is provided with a depression 20, and an integral projection or rib 19 extends rearwardly from the base of this depression. This rib is of an undercut character, i. e., its width enlarges rearwardly. The substantially dovetail cross-section shown in the present drawings embodies these characteristics.

The uniform cross-section of the rod permits individual filler blocks to be cut therefrom and permits such blocks to be superposed or stacked with relation to one another; the curvilinear bottom face of one block snugly contacting and engaging with the curvilinear upper face of the block beneath; and the upper face of each block being similarly adapted to abut and engage snugly with the lower face of the block above. It will be understood that the degree of curvature of the convex face will be substantially the same as the degree of curvature of the concave face.

The rearward projections 19, when arranged in superposed relationship, as shown most clearly in Figure 3, are, in the completed tree filling, embedded within the binding medium 13, whereby the superposed blocks are firmly anchored in position.

It will be understood that the blocks, when inserted, are carefully arranged so that their outer faces do not project beyond the cambium layer 21 (see Figure 2), whereby the tree has an opportunity, in course of time, to heal the wound and ultimately grow over and completely conceal the filling.

The particular advantages of the present improved blocks are illustrated most clearly in Figure 4. The convex and concave surfaces conform substantially to circular arcs, whereby each block, as it is applied to the adjacent block, may be arcuately adjusted either in its entirety or partially with respect to the block or blocks with which it abuts. In the simplest case, the block may, for example, be adjusted in its entirety, thereby tipping the outer face at either an inward or an outward inclination. This adjustability permits the resultant filling to conform to corresponding variations in inclination of the particular tree that is being treated.

In many instances, especially where the cavity is of considerable width, it may be found that one end of the cavity inclines in one direction, while the opposite end of the cavity inclines in the opposite direction, or not at all. With the use of flat-surfaced blocks of the character illustrated in my earlier application, it is necessary, to conform the filling to the tree, to perform considerable shaving and whittling of the outer surfaces of the filling after all the blocks are in position. By the use of the present improved blocks, it is feasible to twist the block in either one or the other direction to effect substantially the same purpose. For example, in Figure 4 I have shown a block 22 superposed upon a block 23, with the left-hand portion of the block 22 in complete parallelism with the block 23, yet with the right-hand portion of the block 22 in twisted or skewed relationship to the block 23. This adjustability of the block 22 with respect to the block 23 is capable of accomplishment without in the least impairing the security and tightness of the joint between the blocks, because the twisting is accomplished by a sort of arcuate rolling adjustment of one block with respect to the other, a procedure which is made possible by the abutting curvilinear faces, one of which is convex and the other concave.

The present improved blocks distinguish from the blocks of my aforesaid pending application in the additional respect that the present blocks have the depression 20 in the rear face. The advantage of this construction lies in the fact that the binding medium 13 will more firmly hold one block in fixed relation to the block alongside of it, notwithstanding the fact that the outer surfaces of the blocks may be in a skewed relationship. Moreover, the depression 20 makes the total depth of the blocks less than that which would otherwise be required, thereby permitting the blocks to be used in shallower cavities. The saving in cost of rubber is a further obvious advantage of the depression 20.

As illustrated and described in my aforesaid pending application, the blocks may, if desired, be provided with longitudinal bores (not herein shown) to provide for enhanced compressibility and distortion of the filler blocks during the subsequent swaying and growth of the tree.

The binding medium which I have referred to herein and in the appended claims is preferably a mixture of asbestos and cement, but any other suitable medium may be employed; and the term "poured" is not intended to connote that this binding medium is necessarily in a completely liquid state when it is introduced. The material may, under certain circumstances, be of plastic character, and the essential quality lies in the fact that it is a homogeneous mass which ultimately hardens, as distinguished from the filler blocks which are discrete and solid at the outset.

All of the advantages of the present type of tree filling, set forth in my aforesaid pending application, apply with equal force to the present improvements, and it is, therefore, deemed unnecessary to set forth these advantages in full in the present specification.

In general, it will be understood that changes in the details, herein described and illustrated for the purpose of explaining the nature of my invention, may be made by those skilled in the art without departing from the spirit and scope of the invention as expressed in the appended claims. It is, therefore, intended that these details be interpreted as illustrative and not in a limiting sense.

In the appended claims the words "a substance having the pertinent characteristics of vulcanized soft rubber" are to be understood as meaning a substance at least approximating vulcanized soft rubber in all of the following characteristics: resilient deformability, toughness, imperviousness to water, and resistance to the deteriorating effects of plant and animal organisms and exposure to the weather.

Having thus described my invention, and illustrated its use, what I claim as new and desire to secure by Letters Patent is—

1. A filler block for a tree cavity, composed of a substance having the pertinent characteristics of vulcanized soft rubber, said block having a substantially plane front face, and top and bottom faces adapted to make snug contact with similar blocks arranged above and beneath the block in stacked relationship, one of said top and bottom faces being convex, the other concave, to permit arcuate adjustment of the block with respect to the blocks above and beneath it, during the stacking procedure, and said block having a depression in its rear face, and an integral rib extending rearwardly from the base of the depression, said rib having a rearwardly enlarging width.

2. A filler block for a tree cavity, composed of vulcanized soft rubber, said block having a depression in its rear face, and an integral rib extending rearwardly from the base of said depression, said rib having a rearwardly enlarging width.

3. A tree cavity filling comprising a series of filler blocks arranged in stacked relationship within the outer portion of the cavity so as to seal the latter, said blocks being composed of a substance having the pertinent characteristics of vulcanized soft rubber, the abutting faces of each block being, respectively, convex and concave, and the blocks being of elongated and of substantially uniform cross-sectional form and held in a deformed and permanently strained condition by their resilient pressure against the surface defining the cavity.

4. A tree cavity filling comprising a series of filler blocks arranged in stacked relationship within the outer portion of the cavity so as to seal the latter, said blocks being composed of a substance having the pertinent characteristics of vulcanized soft rubber, each block being of elongated and substantially uniform cross-sectional form and having top and bottom faces one of which is convex and the other concave, whereby the abutting faces of the stack are transversely curvilinear, the filling comprising also a poured binding medium filling the inner portion of the cavity and means interlocking said medium and said blocks.

5. A tree cavity filling comprising a series of filler blocks arranged in stacked relationship within the outer portion of the cavity so as to seal the latter, said blocks being composed of vulcanized soft rubber, the abutting faces of the blocks being curvilinear, each block having a depression in its rear face and an integral rib extending rearwardly from the base of said depression, said rib having a rearwardly enlarging width, and a poured binding medium filling the inner portion of the cavity and embedding said ribs therein.

6. As a new article of manufacture, a rod of vulcanized soft rubber having a uniform cross-section and adapted to be cut into selected lengths each of which may serve as a filler block for a tree cavity, said rod having a depression in its rear face, and an integral rib extending rearwardly from the base of said depression, said rib having a rearwardly enlarging width.

7. As a new article of manufacture, a rod of vulcanized soft rubber having a uniform cross-section and adapted to be cut into selected lengths each of which may serve as a filler block for a tree cavity, said rod having a substantially plane front face, and top and bottom faces of which one is convex, the other concave, and said rod having a depression in its rear face, and an integral rib extending rearwardly from the base of said depression, said rib having a rearwardly enlarging width.

8. A block for forming a dam in the mouth of a tree cavity, said block being of elongated form and of substantially uniform concavo-convex shape in cross-section and composed of a resiliently deformable material having the pertinent characteristics of vulcanized soft rubber.

GEORGE VAN YAHRES.